United States Patent [19]

Sokolow

[11] B 3,998,438
[45] Dec. 21, 1976

[54] EXTRUDER PLASTICIZING AND MIXING SCREW
[75] Inventor: Nickolas N. Sokolow, Roscoe, Ill.
[73] Assignee: Beloit Corporation, Beloit, Wis.
[22] Filed: Sept. 17, 1973
[21] Appl. No.: 397,674
[44] Published under the second Trial Voluntary Protest Program on March 16, 1976 as document No. B 397,674.
[52] U.S. Cl. ............................................. 259/191
[51] Int. Cl.[2] ...................... A21C 1/06; B29B 1/06
[58] Field of Search .................. 259/185, 191, 192; 425/202, 376

[56] References Cited
UNITED STATES PATENTS

| | | | |
|---|---|---|---|
| 2,581,031 | 1/1952 | Kruzik | 259/191 X |
| 2,838,794 | 6/1958 | Munger et al. | 259/191 X |
| 3,023,456 | 3/1962 | Palfey | 425/208 X |
| 3,197,814 | 8/1965 | Bond, Jr. et al. | 425/376 |
| 3,475,788 | 11/1969 | Heston | 425/202 X |
| 3,486,192 | 12/1969 | Leroy | 259/28 |
| 3,518,721 | 7/1970 | Rukas et al. | 425/202 |
| 3,664,795 | 5/1972 | Heinz et al. | 425/376 |
| 3,671,141 | 6/1972 | Kovacs | 259/191 |
| 3,751,015 | 8/1973 | Hensen | 259/191 |
| 3,762,693 | 10/1973 | Deboo et al. | 259/191 |

*Primary Examiner*—Harvey C. Hornsby
*Assistant Examiner*—Donald B. Massenberg
*Attorney, Agent, or Firm*—Dirk J. Veneman; Gerald A. Mathews; Michael L. Gill

[57] ABSTRACT

A screw for use in a thermoplastic extruder. A plurality of recessed pockets and/or raised lobes are in the screw shaft and these operate as the shaft is rotated to constantly shift the melted and unmelted portions of the plastic resin radially inwardly and outwardly within a pitch length of the screw inside the extruder to quickly and uniformly mix the plastic into a homogeneous melt.

8 Claims, 15 Drawing Figures

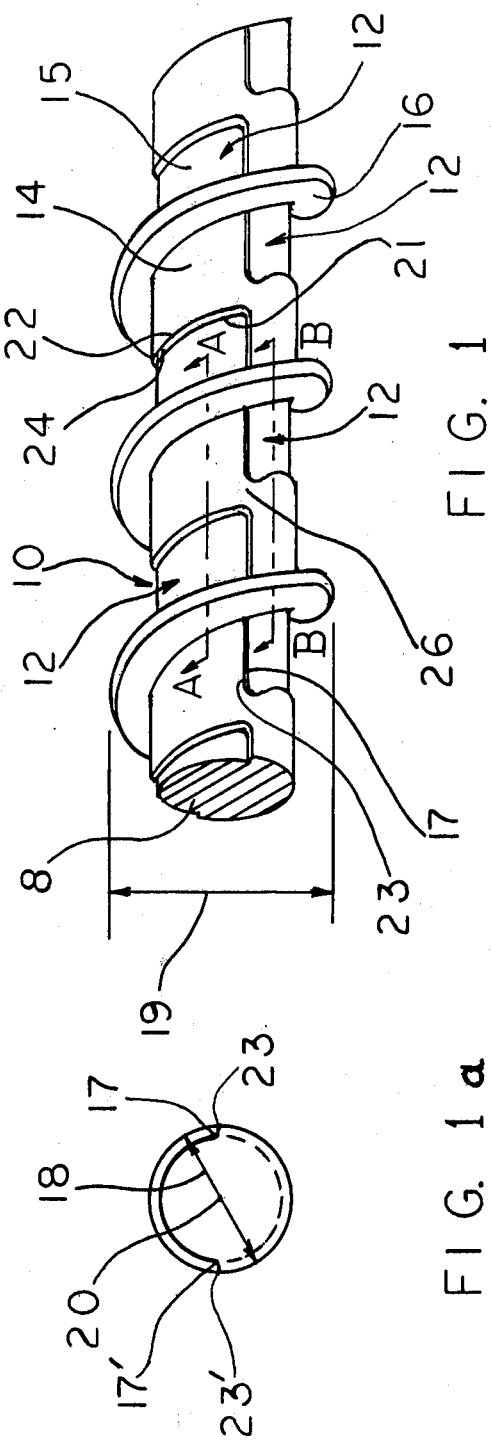
FIG. 1
FIG. 1a
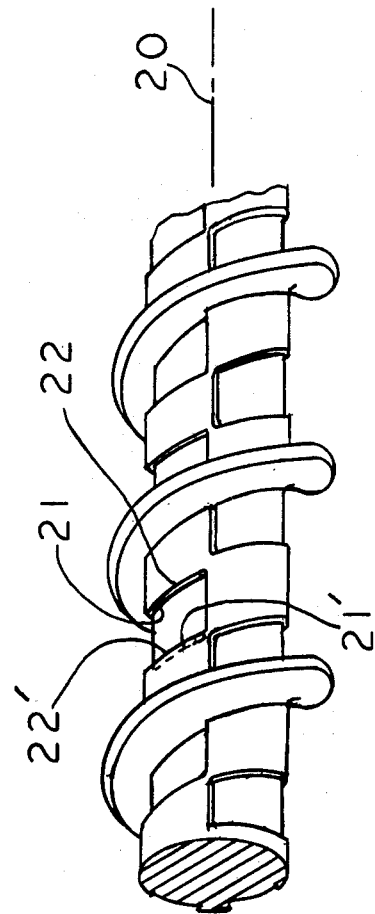
FIG. 2
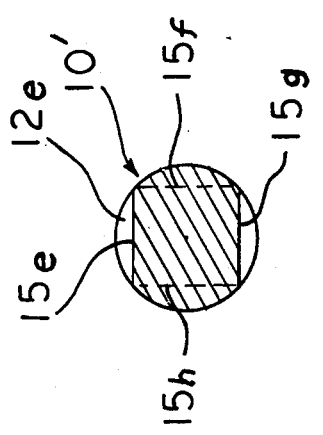
FIG. 12

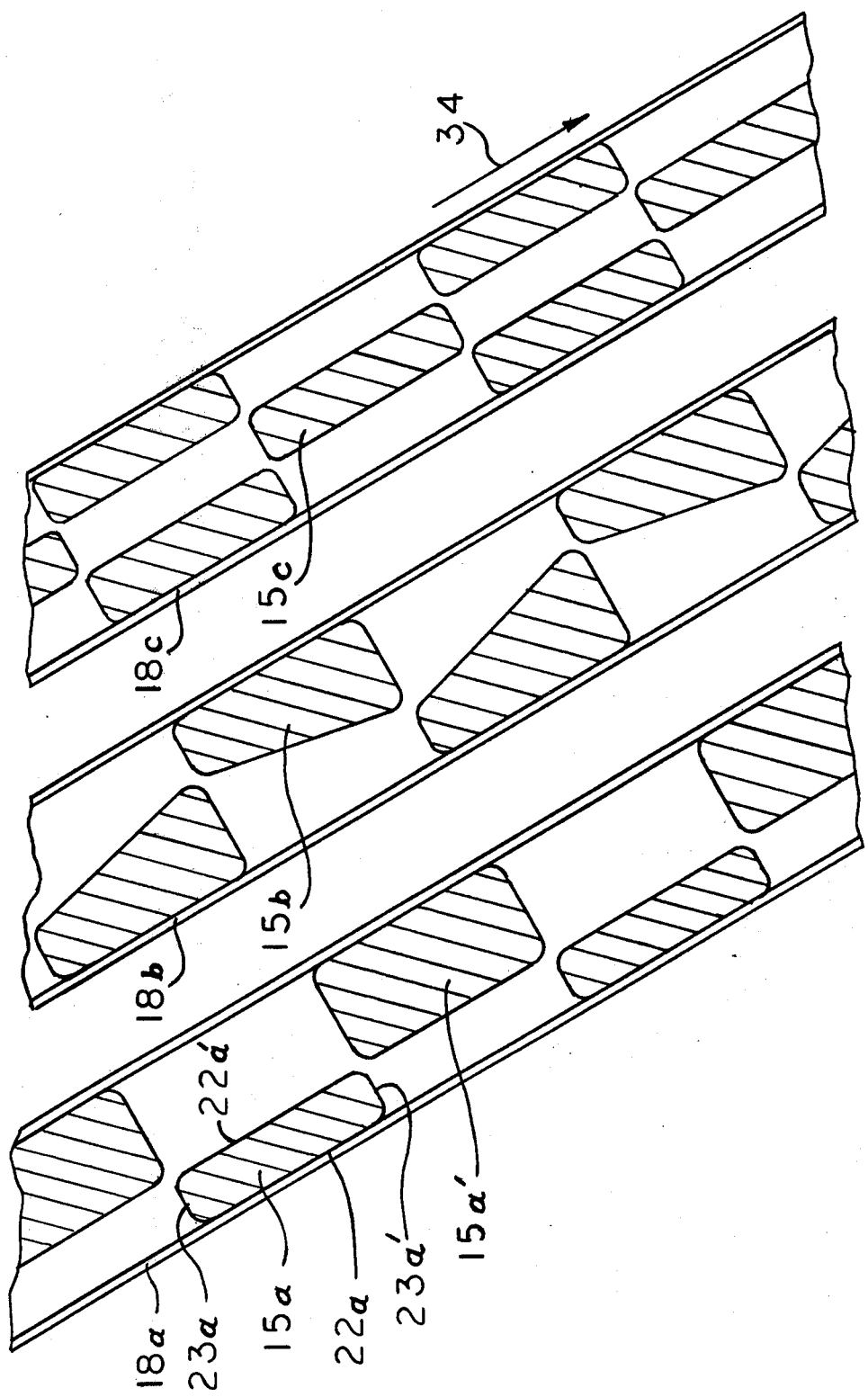

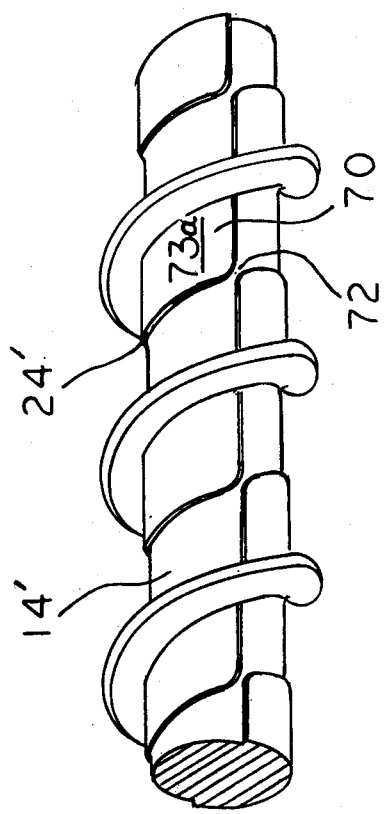
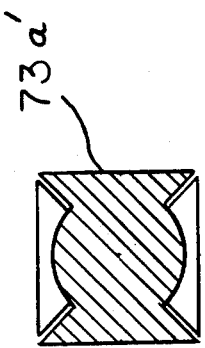
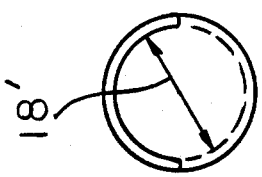
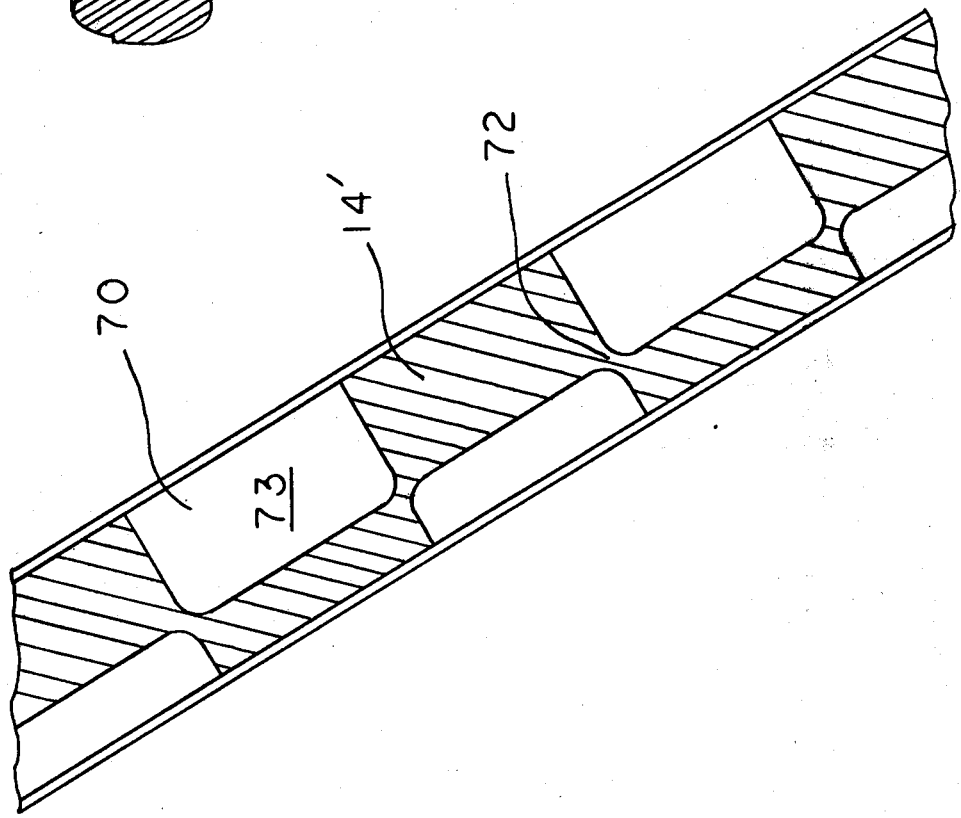

EXTRUDER PLASTICIZING AND MIXING SCREW

BACKGROUND OF THE INVENTION

This invention relates to the mixing and melting of plastic material in an extruder and, more particularly, to the screw which performs these operations in the extruder.

In thermoplastic extruders, screws are used to mix, plasticize and convey the platic material axially along the cylinder bore from the point where the plastic enters in the form of pellets or other solid form to the other end where the plastic exits in the form of a liquid melt. Conventionally, these functions are performed by varying the pitch, thickness and lead of the screw threads at spaced intervals along the length of the screw. The root diameter of the shaft portion of the screw is sometimes also varied uniformly to increase or decrease the cross sectional area and, therefore, the pressure within an axial section along the screw length. Thus, the plastic is mixed, melted and conveyed along successive sections of the screw length. Examples of some typical extruder screw configurations are illustrated in U.S. Pat. Nos. 3,197,814; 3,486,192 and 3,023,456.

However, it has always been difficult to mix the plastic thoroughly to continuously melt new solid material as the pellets tend to form a solid plug adjacent to the screw shaft as they enter the extruder and where they are inclined to remain as they come under the pressure of the operating screw. The rotating screw thread wipes against the extruder bore wall. The shearing action of the plug compressed against the bore wall creates heat which melts off the solid plug surface along the threads' outer peripheral surface. The melted plastic becomes susceptible to being damaged by overheating unless it can be conveyed away and be replaced by an unmelted portion of plastic material. Some prior screw designs attempt to expedite the melting process by inserting a fluted section in the screw to force the plastic over a plurality of axially extending dam-like radial edges to increase the shearing action on the plastic to promote raising its temperature and shorten the melting time. Other prior art screws incorporate reverse threads along a section to reverse the flow and increase the mixing action. But such devices only operate on a relatively small portion of the material at a time and still represent a separation of the mixing, plasticizing and conveying, or pumping, steps. Further, the fluted, or dam-type, screws tend to work satisfactorily only after the plastic has already been partially melted.

SUMMARY OF THE INVENTION

This invention combines the steps of mixing, melting and conveying the plastic material by continuously subjecting the plastic to high shear forces of brief duration. The material closest the shaft of the screw is forced outwardly while the material nearest the wall of the extruder bore, which contains some partially melted plastic, is simultaneously urged radially inward toward the screw axis of rotation. Thus, along a major portion of the screw length, the melted plastic is forced into shearing contact along many interfaces with the unmelted portion of the plastic. This both raises the temperature of the unmelted portion of plastic and decreases the temperature of the melted portion of plastic to more uniformly distribute the heat throughout the entire amount of plastic being conveyed by the screw. This mitigates the possibility of overheating (and potential degradation) of the melted plastic while increasing the temperature (and thereby shortening the time and energy required) to melt the unmelted portion of the plastic material.

The mixing and radial shearing action are provided by a plurality of recessed pockets and/or raised lobes, and the edges defining them, in the shaft portion of the screw. As the screw rotates, the plastic material is forced radially inward, with respect to the axis of screw rotation, into the recessed pockets or beneath the raised lobe surface, thereby producing many interfaces in relative movement between portions of the plastic material within each pitch length for the entire length of the screw, or a shorter length as desired. Since the plastic material melts along the extruder bore wall from shear in the melt film due to screw rotation, a sleeve-like section of melted plastic begins to form on the outermost edges of the screw over the compressed plastic plug where it is wiped off by the screw thread. The continuous radially inward and outward movement of the plastic operates to alternately increase and decrease the thickness of this melted plastic layer which facilitates both the cooling of the thinner portions of the layer (most recently melted) and mixing of the unmelted portions of the plastic with the thicker (relatively cooler) portions of the melted plastic.

Since each pocket and raised lobe is of a relatively short radial height or depth and extends annularly around the shaft for only a portion of its circumference, the multiplicity of radial shearing interface contacts is of a short duration which mitigates against overheating during the shearing action while promoting maximum mixing, all while simultaneously conveying the plastic axially downstream in the extruder bore. Thus, there is no volume restricting structure required to provide plastic melting at a sacrifice to extruder speed and production capacity. The unique design permits melting, mixing and axial conveyence of the plastic to occur simultaneously within each pitch distance of the screw without restricting the extruder to operate at a lower speed than otherwise required in order to adequately perform any one of these functions. Therefore, the extruder can operate faster.

Depending on the type of plastic used and the degree of mixing desired, the screw may be divided into sections wherein only lobes or pockets are provided. Since the lobes extend above the shaft surface and are not interconnected, but spaced apart, plastic can move around their side walls as well as over their upper surface and the shearing action produced is not as intense as that produced by the plastic moving into and out of the pockets wherein all of the plastic must eventually pass out over the pocket walls.

The pockets and lobes, being positioned along the pitch length of the helical screw thread, can operate to mix and promote melting for as far as they extend on the shaft. Thus, the speed of the melting process is increased since the continuous shifting and mixing pushes new solid plastic against the bore wall to be melted without choking off the conveying capacity of the screw by requiring special plasticizing sections of small cross-sectional area. Solid material is not allowed to accumulate and remain unmelted adjacent the shaft surface to thereby lengthen the overall melting time.

It is, therefore, an object of the invention to provide an extruder screw which operates to facilitate heat transfer between the melted and unmelted portions of plastic within the extruder.

Another object of the invention is to provide an extruder screw which operates to continuously mix and facilitate melting the plastic along the working length of the screw.

Another object of the invention is to mix, melt and convey the plastic at the same axial location on the screw.

Another object is to reduce the tendency of the melted plastic to remain laminar as it moves along the screw length.

Another object of the invention is to provide an extruder screw which operates to continuously force portions of the plastic radially inward and outward, with respect to the axis of screw rotation, to increase the shearing action within the plastic.

Still another object is to increase the speed with which the plastic is melted as it travels axially along the screw length by forcing melt film against the barrel wall, thus creating a higher shear rate and faster melting.

A feature of the invention is the provision of pockets and/or raised lobes in the screw shaft.

Another feature of the invention is that the intense radially inward and outward shearing forces on the plastic operate to prevent the plastic from becoming plugged in the pockets or adhering to the lobes during operation.

An advantage of the invention is that the screw can be run faster because plasticizing and mixing is more thorough and finished in a shorter length of time.

These and other objects, features and advantages of this apparatus will become apparent as the attached figures are reviewed while reading the detailed description of the preferred embodiments.

BRIEF DESCRIPTION OF THE DRAWING

FIG. 1 is a perspective view of a section of the screw showing the recessed pockets.

FIG. 1a is an end view of the shaft member of the screw shown in FIG. 1.

FIG. 2 is another perspective drawing of a section of the screw showing the recessed pockets in a checkerboard pattern on the shaft member.

FIG. 6 is a developed view of the surface area of the shaft along the pitch length between screw threads showing unequal rectangular areas of the bottom surfaces of the pockets.

FIG. 7 is a developed view similar to that shown in FIG. 6 but wherein the recessed land portion areas are shown in a quadrangular configuration.

FIG. 8 is another developed view similar to FIG. 6 wherein the recessed land portion areas are in a more uniform rectangular shape.

FIG. 9 is a developed view of the screw shown in FIG. 10.

FIG. 10 is a perspective view of a screw section showing the raised lobes on the shaft.

FIG. 12 is a cross sectional end view of a screw having chamfered pockets forming flat bottom surfaces.

FIG. 13 is cross sectional end view of the shaft as shown in FIG. 10.

FIG. 14 is a cross sectional view of an embodiment having raised lobes on the shaft wherein the upper land surface area of the lobes is planar and parallel to the shaft axis of rotation.

DESCRIPTION OF THE PREFERRED EMBODIMENTS

Figure 3:
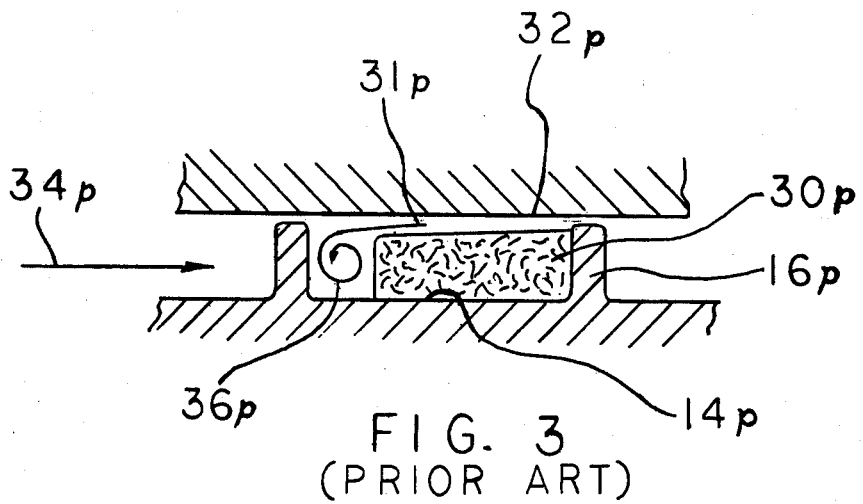
FIG. 3 is a cross sectional side view along the axis of a pitch length portion of a regular prior art screw within the extruder bore.

FIG. 1 illustrates a screw 10 constructed according to the principles of the invention. The single thread 16, or flight, having an outer diameter 19 is helically wound about the shaft member portion 8 and has a circular end view profile. The diametric distance 18 between opposed shaft surface portions 14 represents the root diameter of the screw. Spaced axially along the screw's longitudinal axis of rotation 20 are a plurality of recessed land portions 12 which are also referred to as pockets. In the preferred embodiment, the shaft is cylindrical for its entire length, but it is contemplated that a section could be tapered if desired. Throughout the figures, like numerals will refer to like items and primes and alphabetical letters will differentiate between more than one like item.

In FIGS. 1, 2, 6 and 8, these recessed pockets 12 have a top plan view area in the shape of a parallelogram with two opposite edges 23, 23' extending substantially parallel with axis 20 and two other edges 22, 22' extending somewhat transversely thereof. The recessed bottom surface land area 15 of pockets 12 in both FIGS. 1 and 2 is substantially the same shape as the surface 14 portion of shaft member 10 which is interposed between pockets 12 in a checkerboard-like pattern. In FIG. 2, there is one more pocket 12 per pitch length of the screw than shown in the embodiment of FIG. 1. The pockets extend around the shaft along a path following the screw thread, i.e. a spiral path.

The recessed land portions are defined by bottom land surface areas 15, which are parallel to the shaft member surface 14 which in turn is substantially cylindrical for the entire working length of screw 10, and a wall 24 formed between bottom surface 15 and shaft member 14. As shown in FIGS. 1, 1a, and 6, the upper and lower parts of continuous wall 24 are defined by bottom edges 17, 17', 21, 21' and top edges 22, 22', 23, 23'. Edges 17, 21, 22 and 23 are shown in the figures as being sharply defined. In some embodiments, side edges 17, 17', 23, 23', which extend substantially coaxially with the shaft may blend into surfaces 15 and 14 so smoothly as to render them imperceptible or even nonexistent. In fact, all of the pocket or lobe edges are made smooth to the extent necessary to prevent plastic from accumulating on them. In this connection, it is anticipated that recessed land portions 12 may be formed by machining a flat spot to form bottom surface 15 in shaft member 14 so that part of circumferential sidewall 24 is eliminated and bottom surface 15 is parallel not with the cylindrical surface 14 of the shaft member, but with the longitudinal axis of rotation instead. A cross section of a screw having such chamfered pockets 12 forming flat bottom surfaces 15e, 15f, 15g, 15h is shown in FIG. 12.

In each of the various configurations of recessed pockets 12, the shaft member surface 14 is made continuous for each pitch length by providing a neck area 26 thereon between contiguous corners of adjacent pockets 12 so that the pockets and recessed bottom land surfaces 15 thereof are not interconnected.

FIGS. 6, 7 and 8 are developed views of the shaft surface portions 14, 15 having different patterns of recessed bottom land surfaces 15a, 15b, 15c, respectively. Thus, depending on the type of plastic being used, the screw speed, tolerances between the screw thread and internal bore of the extruder and other such parameters, various area configurations for the pockets and their relative proportional area to that of the shaft member may produce optimum results depending upon the selected parameters. Areas 15a and 15a' have different rectangular shapes, while areas 15b in FIG. 7 have quadrangular shaped areas (the non-parallel sides of which can be extended to form triangular shaped areas) and areas 5c in FIG. 8 are of uniform rectangular shape.

Operation of this screw in a plastic extruder can perhaps be better understood if compared to the operation of a standard screw (i.e. a screw having a continuous, smooth surfaced shaft portion of constant root diameter for at least a portion of its length and a helical screw thread also having a constant outside diameter which fits into the cylindrical bore of an extruder).

In FIG. 3, such a prior art extruder is shown having a solid bed, or plug, of plastic particles or pellets 30p packed along the pitch distance between successive turns of screw thread 16p mounted within the cylindrical bore 32p of the extruder barrel. As the screw turns, the screw threads urge the plastic to move in the direction of arrow 34p. The heat from the shearing action of the screw thread squeezing the plastic against the bore wall 32p begins to melt the plastic according to the operating principles of screw extruders. The melted plastic forms roughly a cylindrical shape 31p and it tends to remain stationary, relative to the solid plug, along the outer diameter of the screw thread. Since it cannot easily pass the next screw thread in an axial direction, a major portion of it begins to accumulate on the forward side of the thread. This accumulation and relative movement of melted plastic is designated by arrowed numeral 36p. Eventually, as the screw moves the plastic plug 30p axially within the extruder, the entire amount of plastic is likewise mechanically worked and melted.

Figure 4:
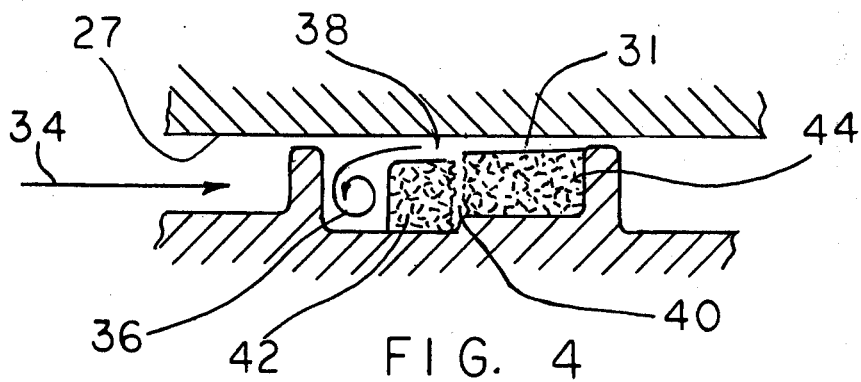
FIG. 4 is a cross sectional side view through section A—A of the screw in FIG. 1 positioned within the bore of an extruder through the recessed pocket within the screw shaft.
Figure 5:
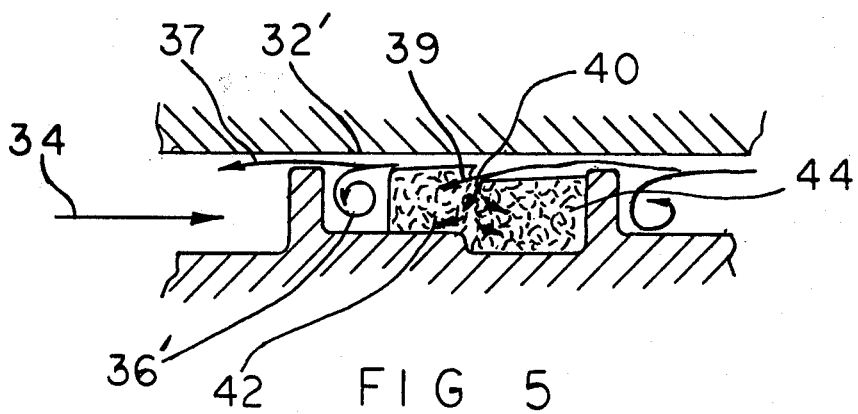
FIG. 5 is a cross sectional view through section B—B of the screw shown in FIG. 1 which has rotated to show another pocket within the shaft.

The operation of a screw containing pockets is illustrated in FIGS. 4 and 5. The screw thread outer diameter 19, shaft root diameter 18, and extruder inner bore surface diameter 27 are all constant throughout the axial working length of the extruder. In FIG. 4, the plug of plastic has begun to melt and form the cylindrical shape 31. As the screw turns and the threads move forwardly in direction 34, a portion of the plug of plastic pellets is forced radially inwardly into the recessed pocket 12 which induces the melted plastic to shift to fill the gap 38 formed thereby between the outer periphery of the plastic plug and the extruder inner bore wall 32. The radially inward shift of a portion of the plastic into the pocket also causes a fissure 40 to develop, thereby dividing the plug into trailing and leading portions 42, 44 in the pocket 12 and remaining on the screw shaft member surface 14, respectively. Fissure 40 is located along pocket edge 22, and similar fissures are produced over pocket edges 23, 23'. In fact, regardless of the pocket bottom land surface shape, fissures are produced over all pocket edges. Some of the melted plastic is forced into these fissures between the interfaces of plug portions to enhance mixing, break up the plug and to carry some of the melted plastic away from the extruder bore wall surface 32 to mitigate the possibility of its being overheated. The melted plastic entering the fissures is replaced by solid plastic as the screw turns to promote additional melting.

When melting plastic in an extruder, it is important that the plastic not be overheated or scorched. Since melted plastic is hotter than the unmelted pellets, the faster and more thoroughly these melted and unmelted portions are mixed, the quicker any excess heat will be absorbed from the melted portion into the unmelted portion. This is conducive to both reducing the possibility of overheating the melted portion and increasing the temperature of the unmelted portion, thereby reducing the time and energy to melt the plastic.

The fissures also accelerate mixing the plastic by allowing part of the melted portion on the outer periphery of the screw to flow radially inwardly to contact part of the lower portion of plastic plug (near the shaft surface 14).

Additional mixing and plasticizing is produced as the screw rotates to the position shown in FIG. 5. Here, under the combined pressure of the forces imposed by the turning screw thread and the radially inward and outward movement of the plastic, relative to the axis of screw rotation, as it travels over moving shaft member surface 14 and bottom land surface 15, the trailing plug portion 42 is compressed against the bore wall 32 while the leading plug portion 44 is forced into another pocket 12. This compresses the previously melted plastic on the outer periphery of plastic plug 42 into a thinner layer while moving some of this melted plastic forwardly to a position over the leading plug portion 44. The unmelted plug portion is urged upwardly to the outer thread periphery to be worked and melted.

As the leading plug portion goes into a pocket, the material already there is forced out and up onto the shaft surface 14 again. All of this radially inward, outward and circumferential movement of the plastic creates a multitude of fissures whose location is constantly shifting in the plastic to promote plasticizing of the unmelted portion and intermixing of the melted and unmelted portions at the fissure interfaces.

Since all screw threads have a lead angle, the plastic is also shifted somewhat in an axial direction 34 as the screw rotates whereby fissure 44 will occur in a slightly different axial location in the plastic plug as it shifts from the position shown in FIG. 4 to the position shown in FIG. 5. Also, the size and shape of the recessed pockets 12, and their position relative to one another, will assist the formation of, and accentuate the shift in, the fissure locations as the plastic moves into and out of the pockets. The alternation between leading and trailing plastic portions 44, 42 being compressed and pressure relieved, relative to each other, and the constantly shifting position of the fissures combine to provide high radial shearing forces of brief duration and to thoroughly mix and plasticize, without overheating it, each pitch length distance along the screw axis as the plastic moves into and out of the pockets. The duration of high shearing forces is a function of screw speed, shaft diameter and circumferential width of the pocket. In FIG. 5, arrows 36', 37, 39 illustrate the various paths taken by the plastic as it travels between the thread edge and extruder bore wall 32' (arrow 37), collects in front of the screw thread (arrow 36') and mixes with the solid plastic particles in fissure 40 (arrow 39).

Some preferred shapes and locations of pockets are shown in FIGS. 6 through 8, although other obvious shapes and modifications thereof have been contemplated which also produce the desired action on the plastic and which are intended to fall within the scope of the appended claims.

The newly produced melted plastic over the trailing plug portion 42, combined with any melt squeezed over by its rise out of the pocket (FIG. 5), is forced into the cracks of the compacted pellets forming the plug to still further contribute to the mixing and plasticizing process. This operation is reversed when the leading portion 44 is compressed (FIG. 4) and the trailing portion 42 is relieved.

As the plastic moves from the rear of the screw in the extruder to the front, the continuous formation of fissures and shearing action at the interfaces thereof, together with a constant pressure to move the plastic radially inward and outward as it passes into and out of the pockets, combines with the heat produced between the plastic working against the extruder bore wall to completely melt the plastic and very thoroughly mix it before it is expelled.

FIGS. 9, 10, 13 and 14 illustrate a different embodiment. Instead of pockets recessed in the screw shaft, a plurality of raised lobes 70 are formed in the shaft surface 14'. As with the recessed pockets, a side wall 24' defines the lobe periphery. In FIG. 9, the shaded portion represents the radially innermost surface (i.e. shaft surface 14') to be consistent with FIGs. 6–8 wherein the shading designates the bottom surface of the pockets. The lobes are not interconnected and gap 72 is maintained between contiguous lobes on the continuous, cylindrical shaft surface 14'. The upper land surface area 73 of the lobes may be either arcuate to be parallel with the screw shaft surface, or planar (FIG. 14) to a parallel with the shaft axis of rotation, as desired. In addition, it is contemplated that the planned view shape of the lobes can be rectangular, quadrangular, triangular or virtually any other geometric shape as with the pockets.

In operation, the compression, pressure relieving and radial shearing action on the plastic occurs in substantially the same manner as the operation described in connection with the pockets. However, since the lobes form a raised upper land surface above the cylindrical shaft, some plastic will move around on the shaft surface through gap 72 between lobes as well as over the upper land surface. Therefore, the intensity of the radially inward and outward shearing action as the plastic moves onto and off the lobe base surfaces will be slightly less than that provided with the recessed pocket embodiment.

Figure 11:
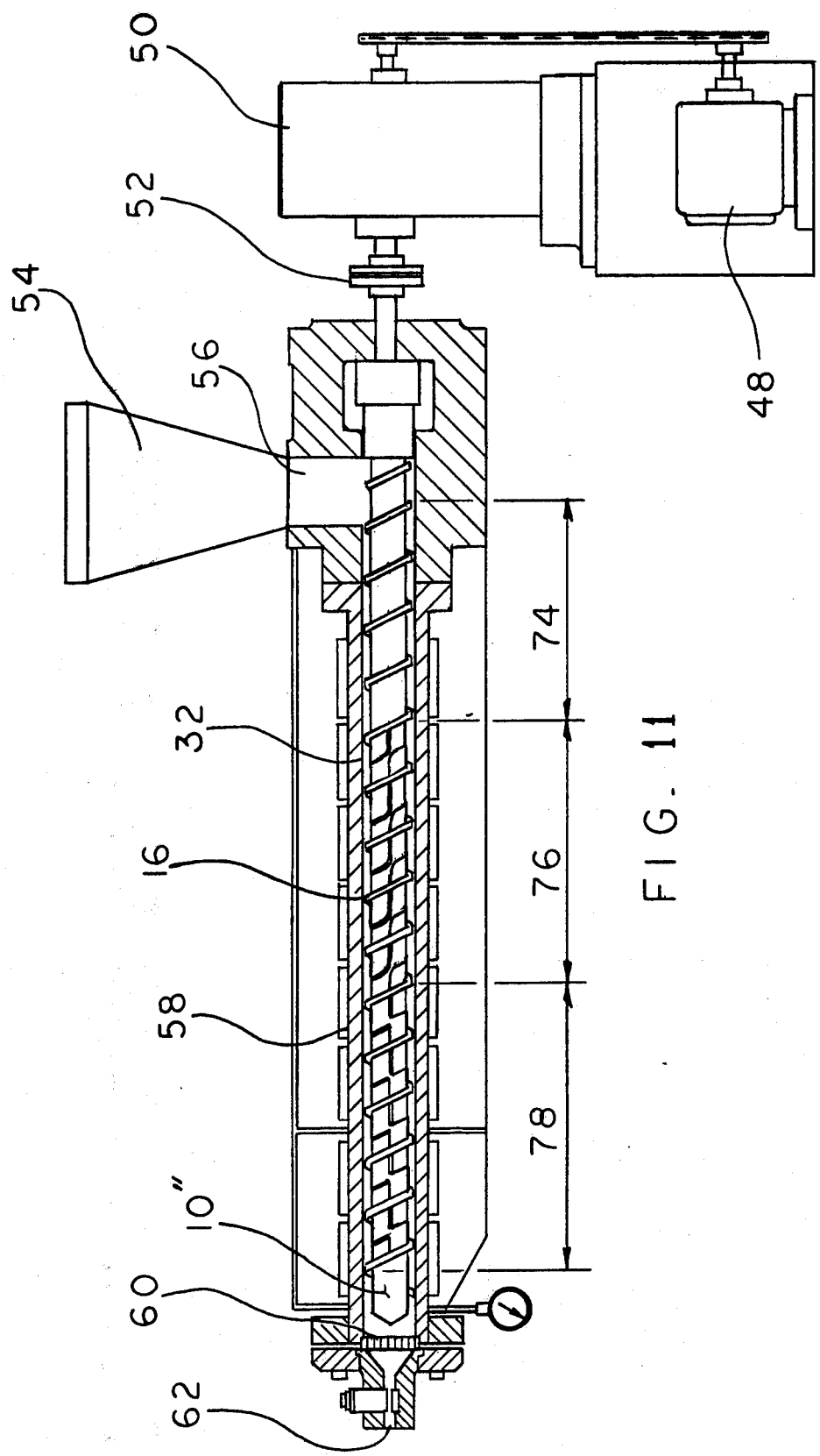
FIG. 11 is side elevational view of a plastic extruder having the screw operatively mounted therein.

Referring to FIG. 11, the screw can be divided into sections to take advantage of the relative intensities of shearing action provided by the lobe and pocket configurations. For purposes of illustration, the screw in the extruder in FIG. 11, has been divided into roughly equal length sections marked 74, 76, 78, to designate plain, lobe and pocket sections, respectively. Generally, the upstream portion of the screw near the plastic inlet in any case has a plain shaft portion without any lobes or pockets since it takes a short period of time for the screw thread to mechanically work the solid pellets, flakes or chips and bring them up to melting temperature before mixing is required.

Further, it is contemplated that the remainder of the screw length can be made up entirely of either the lobe or pocket configurations or both of them in various axial lengths and positions in order to produce the desired degree of mixing at specified positions along the screw length. Either the pockets or lobes could extend for but a portion of the axial length of the threaded shaft as desired.

FIG. 11 illustrates a conventional plastic extruder in which screw 10 is rotatably mounted to operate as previous described. Except in so far as the construction and operation of the above described screw is concerned, the construction and operation of the extruder is conventional. Motor 48 turns screw 10'' through a speed reducer 50 and coupling 52. Plastic pellets are held in hopper 54 and introduced through feed throat 56 to the interior of the cylindrical bore of the extruder barrel 58. The diameter of screw thread 16 is also constructed to form a cylindrical peripheral edge profile to fit within the extruder bore. The working length is the axial length of the screw thread. Heating elements 64 are mounted about the external periphery of the extruder barrel to maintain the parts at a uniform temperature and prevent chilling the melted plastic on the bore wall. Melted plastic is forced through a screen pack 60 and out through nozzle 62.

Thus, a new extruder screw has been described which achieves the objects and advantages set forth by continuously subjecting to plastic to radially inward and outward movement and intense shearing action of brief duration all along the shaft length containing the pockets and lobes to thoroughly mix the plastic while simultaneously conveying and melting it before discharging it from the extruder. No volume restricting or a verse thread sections are utilized or required which would slow the speed of extruder operation.

What is claimed is:
1. A screw for use in the bore of a plastic extruder, said screw comprising:
   a substantially straight, cylindrically shaped center shaft member of uniform diameter and cross-section throughout the length thereof having a longitudinal axis of rotation and a peripheral surface;
   a raised screw thread superimposed on the shaft member and extending continuously axially therealong;
   a plurality of land surface areas on the shaft member surface, non-coincident therewith, along the pitch length of the screw thread for at least a portion of the screw length;
   the land surface areas are arranged in a checkerboard pattern in the direction of a path following and adjacent the screw thread along the shaft member surface, wherein some of the land surface areas form the bottoms of pockets recessed in the shaft member surface, and some of the land surface areas form the upper surfaces of lobes extending above the shaft member surface.

2. A screw for use in the bore of a plastic extruder, said screw comprising:
   a substantially straight, cylindrically shaped center shaft member of uniform diameter and cross-section throughout the length thereof having a peripheral surface;
   a raised screw thread superimposed on, and extending continuously around, the center shaft member;
   a plurality of pockets, each having a bottom land surface, spaced from one another in the shaft member surface and arranged in a checkerboard pattern extending for at least part of the screw length.

3. The screw as set forth in claim 2, wherein:

the areas of the shaft member and pocket bottom surface portions are substantially equal.
4. The screw as set forth in claim 3, wherein:
the pocket bottom land surface areas are arcuate and parallel to the shaft member surface.
5. The screw as set forth in claim 3, wherein:
the pocket bottom land surface areas are planar.
6. The screw as set forth in claim 5, wherein:
the planar bottom land surface areas are parallel with the shaft axis of rotation.
7. A screw for use in the bore of a plastic extruder, said screw comprising:
a substantially straight, cylindrically shaped center shaft member of uniform diameter and cross-sectional area throughout the length thereof having a peripheral surface;
a raised screw thread superimposed on, and extending continuously around, the center shaft member;
a plurality of spaced apart pockets formed in the screw shaft surface and arranged in a checkerboard pattern, at least two such pockets each pitch length of the screw shaft, and extending for at least a part of the screw length, whereby plastic introduced into the bore is subjected to rapid cycles of relative compression and relieved pressure as the screw rotates and urges the plastic into and out of the pockets producing intense radially inwardly and outward shearing forces of brief duration and facilitates rapid mixing of the plastic within each such pitch length;
a plurality of spaced lobes on the screw shaft surface, downstream of the pockets, arranged in a checkerboard pattern, each lobe having an upper land surface, at least two such lobes each pitch length of the screw, and extending for at least a part of the screw shaft length, whereby shearing forces of relative less intensity than provided by said pockets, and of brief duration, are produced on the plastic as it is urged over the upper land surface, around the sides of the lobes, and back on to the shaft surface within each such pitch length.
8. The apparatus as set forth in claim 7, wherein:
the surface of the working length of the screw is cylindrical;
each of the pockets and lobes has a land surface area which is arcuate and parallel to the screw shaft surface.

* * * * *